United States Patent [19]

Peterson et al.

[11] 4,357,057
[45] Nov. 2, 1982

[54] LAMINATED BEARING WITH IMPROVED LOW TEMPERATURE OPERATING CHARACTERISTICS

[75] Inventors: Robert R. Peterson, Hudson; Daniel S. Ventura, Malden, both of Mass.

[73] Assignee: Barry Wright Corporation, Newton Lower Falls, Mass.

[21] Appl. No.: 286,748

[22] Filed: Jul. 27, 1981

[51] Int. Cl.$^3$ .................. F16C 27/08; F16C 17/10
[52] U.S. Cl. ........................................ 308/26; 308/28; 308/DIG. 4; 428/323
[58] Field of Search ............... 428/212, 217, 218, 323; 308/26, 2 A

[56] References Cited

U.S. PATENT DOCUMENTS

| | | | |
|---|---|---|---|
| 3,679,197 | 7/1972 | Schmidt | 308/26 |
| 3,941,433 | 3/1976 | Dolling et al. | 308/26 |
| 3,958,840 | 5/1976 | Hickox | 308/2 A |
| 4,040,690 | 8/1977 | Finney | 308/26 |
| 4,105,266 | 8/1978 | Finney | 308/26 |
| 4,142,833 | 3/1979 | Rybicki | 308/26 |
| 4,256,354 | 3/1981 | Peterson | 308/26 |
| 4,263,243 | 4/1981 | Wilson et al. | 308/26 |
| 4,286,827 | 9/1981 | Peterson et al. | 308/26 |
| 4,291,925 | 9/1981 | Peterson et al. | 308/26 |

Primary Examiner—William J. Van Balen
Attorney, Agent, or Firm—Milton E. Gilbert; Gary E. Ross

[57] ABSTRACT

A laminated device such as a bearing or coupling comprising an inner and an outer housing with a laminate therebetween of alternating resilient and non-extensible layers wherein at least one of its resilient layers is made of a material characterized by having a damping coefficient different from that associated with the material of at least one other resilient layer and preselected so as to improve the uniformity of the strain distribution within the laminate and, thereby, the low temperature operating characteristics of the device. In another embodiment of the invention, at least one of the resilient layers is comprised of discrete portions or segments, each having a nominal damping coefficient preselected so as to improve the bearing's operating characteristics in low temperature applications.

10 Claims, 2 Drawing Figures

LAMINATED BEARING WITH IMPROVED LOW TEMPERATURE OPERATING CHARACTERISTICS

BACKGROUND AND SUMMARY OF THE INVENTION

This invention relates to compressive load carrying bearings and more particularly to laminated bearings of the type comprising alternating bonded layers of a substantially resilient material, such as an elastomer, and a substantially non-extensible material, such as a metal.

It is well known that the compressive load carrying ability of a given thickness of an elastomeric material may be increased many times by subdividing it into a plurality of layers and separating the layers by intervening layers of a non-extensible material. At the same time, however, the ability of the resilient material to yield in shear in a direction parallel to the layers is substantially unaffected. This concept has been adopted or utilized in the design of different forms of laminated bearings, as exemplified by the following: application Ser. No. 061,009 filed on July 26, 1979, now U.S. Pat. No. 4,291,925; application Ser. No. 067,993 filed on Aug. 20, 1979, now U.S. Pat. No. 4,256,354; and application Ser. No. 083,598 filed on Oct. 11, 1979, now U.S. Pat. No. 4,286,827, and the prior art cited therein. This concept has also been adopted or utilized in the design of different forms of flexible couplings, such as those described in application Ser. No. 185,028 filed on Sept. 8, 1980; and application Ser. No. 233,711 filed on Feb. 12, 1981, and the prior art cited therein. The listed cases are all commonly assigned to the assignee of the present invention.

Laminated elastomeric bearings of various types are commonly used in commercial applications where it is necessary to carry large, compressive loads in a first direction and also to accommodate limited relative movement in, for example, several other directions. The bearings are designed so that the large, compressive loads are carried generally perpendicular to the resilient lamillae. For the usual laminated bearing application it is desirable, if not essential, to have a bearing design which provides an optimum combination of load-carrying capability, spring rate, and strain distribution consistent with cost and life-expectancy considerations. For example, a bearing of conical geometry employed in a helicopter main rotor retention system is required to undergo dynamic and static torsional deflection, including cyclic motion, as well as dynamic and static compressive loading. The bearing experiences shear strain produced from a torsional deflection about the bearing central axis. Additionally shear strain is induced by application of the compressive loads which may be either axially or radially directed. Thus, torsional shear strain and compression-induced shear strain are present in many operating situations.

The bearing cases listed above describe various means, for example, for improving strain distribution in the bearings by controlling the modulus of elasticity from layer to layer or within a layer so as to improve operation in normal applications of the bearing. The present invention concerns another property or characteristic of elastomer and attempts to resolve a problem which has heretofore limited the practical temperature operating range of the bearing.

Experience with such laminated devices has recently shown that the operational characteristics of the device are less than desirable when it is used in low-temperature environments, for example, when the ambient temperature is below 0° F.

A problem with such devices in such environments is that heat generated by hysteresis produces a non-uniform temperature gradient across the laminate due to the "heat sink" effect attributable to the inner and outer housings, the air, and the metal layers in the laminate. Since the shear spring rate and modulus of the elastomer vary with temperature, the non-uniform temperature gradient results in a non-uniform strain distribution within the bearing which can cause premature degradation of elastomer layers after prolonged operation in the environment. Further, the operational characteristics of the device are adversely affected since certain layers adjacent the heat sinks are sharing a lower percentage of the total torsional motion than possibly the designer of the device had anticipated.

It is therefore an object of the present invention to provide a laminated device suited to cold weather operation which is of a design further suited to the economical manufacture thereof.

It is a further object of the present invention to provide a more uniform temperature distribution over each elastomeric layer and from layer to layer within the laminate of a device, such as a bearing or coupling, so as to improve the operating characteristics of the device for a low ambient temperature use.

Another object of the present invention is to provide a more uniform strain distribution than would otherwise occur due to the non-uniformity of the temperature gradient in cold weather use of such a device.

These and other objects of the invention are addressed by providing a device, such as a laminated elastomeric bearing or coupling comprising a substantially rigid interior housing and exterior housing, said housings joined together by bonded concentric lamillae comprising alternating strata of resilient material and substantially non-extensible material characterized by having a resilient layer adjacent the inner and outer housings more highly damped than the other resilient layers within the laminate. Further, the resilient layers within said device can be segmented into a plurality of discrete portions, or otherwise graduated, so as to permit more highly damped elastomer material to be selectively disposed adjacent the convection boundary between, for example, the laminate and the ambient air than is disposed away from said boundary. Thus, the laminate has more highly damped elastomer material about its periphery than that disposed away from said periphery and within the laminate. By this expediency the operation of the device in low temperature applications is improved.

DESCRIPTION OF THE DRAWINGS

Still other features and many attendant advantages of the invention will be rendered obvious by the following detailed description of the preferred embodiment which is to be taken in conjunction with the accompanying drawings, wherein.

DESCRIPTION OF A PREFERRED EMBODIMENT

Figure 1:
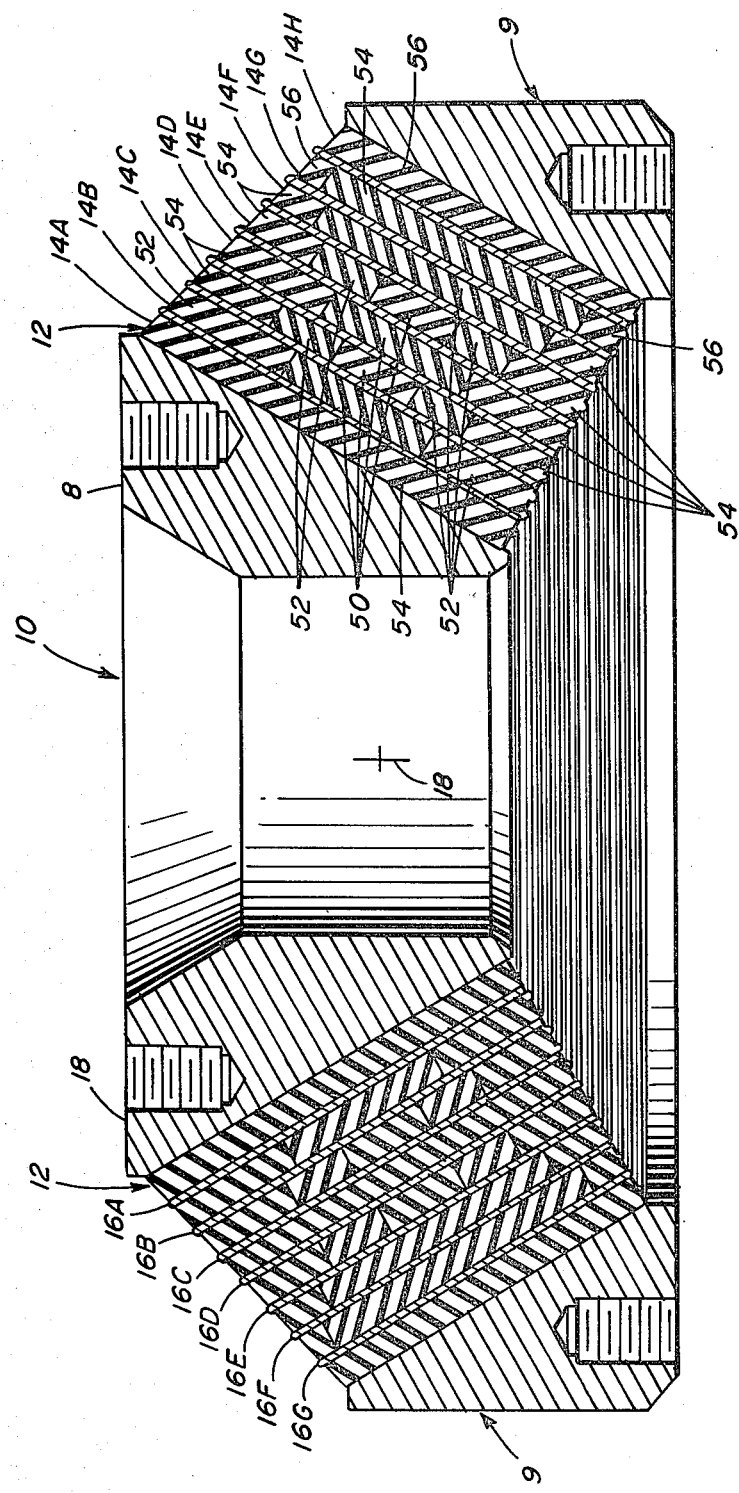
FIG. 1 is a longitudinal sectional view of the components of a conical bearing assembly made in accordance with this invention.

The present invention relates to devices such as couplings or bearings which are generally known in the art and discussed above. As an example of such device FIG. 1 illustrates one geometry for a bearing, generally designated 10, incorporating the invention. A significant variety of laminated bearings is characterized by having housings 8 and 9 and a laminate 12 bonded therebetween comprising a number of alternating layers 14A–14H and 16A–16G respectively of substantially resilient material such as an elastomer and substantially non-extensible material such as a metal or substantially rigid plastic, each being disposed concentrically about one another and about a common center axis 18. Thus, successive alternating layers 14A–14H, 16A–16G are disposed at successively greater radial distances from the common center axis 18. The layers shown are of a conical, or frusto-conical shape and thus the bearing 10 is generally referred to as a conical bearing. The invention can be incorporated into a variety of other bearing configurations, notably, bearings which essentially have laminates in shapes, for example, approximating cylinders, cones, spheres, or other geometries or combinations thereof.

To convey an understanding of the invention, a brief discussion of material science may be in order.

It is well known that when a force is applied to an elastomeric material causing distortion, all of the energy input is not returned when the force is removed and the material returns to its original form. Some of the energy is converted to heat through an internal loss mechanism called "hysteresis." This loss property of elastomers is also called "damping" when referring to a dynamic device. It is typically designed into, for example, a coupling or vibration isolator to limit transmissability at resonance. In a device such as a laminated bearing 10, damping is often maintained at a low level to reduce internal heat build-up which could cause degradation of the elastomer. In an elastomeric bearing which will be exposed to low temperatures, for example, temperatures below 0° F., the stiffness of the elastomer adjacent conversion boundaries (as described more specifically below) increases significantly. This results in a less uniform strain distribution over the bearing 10, as well as an increased force requirement to torsionally deflect the bearing in operation. This in fact may render the bearing 10 otherwise unsuitable to cold weather operation in many applications.

Figure 2:
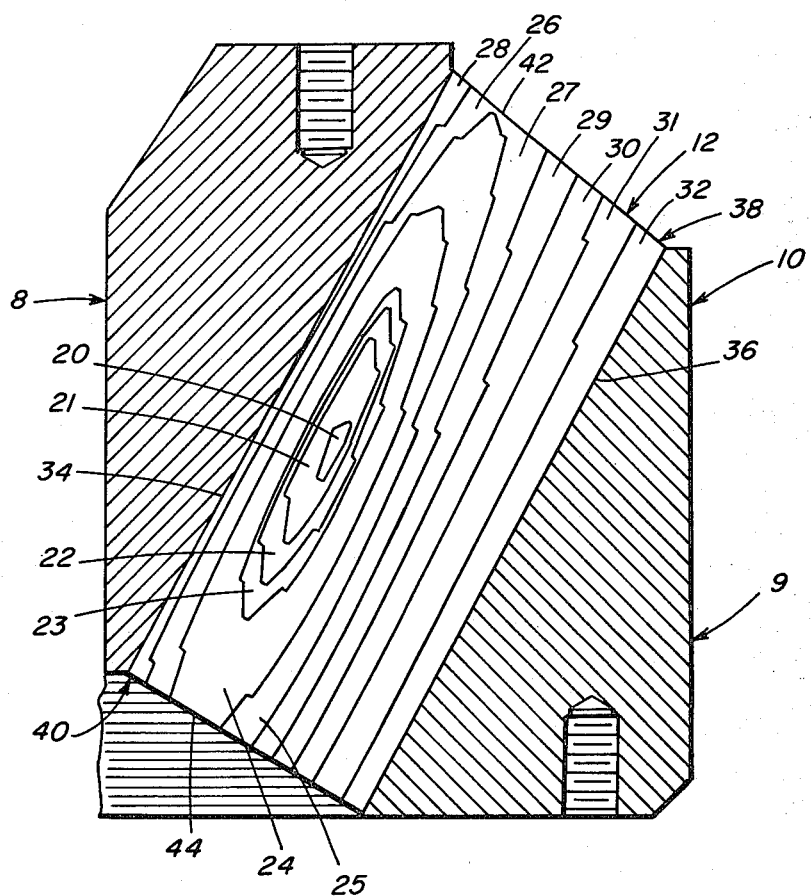
FIG. 2 is a partial sectional view of the bearing assembly of FIG. 1 with super-imposed thereon, isothermal lines illustrating the effect of hysteresis heating of the laminate.

It should be understood that if the bearing 10 is cold throughout, the elastomer will react uniformly to the cold and thus proofer a uniform degree of stiffness, through one which may be far greater than that which may be typically expected for a bearing of that size and shape under so-called normal operating conditions. As the internal temperature rises within the bearing 10 due to hysteresis heating, a pattern such as that shown in FIG. 2 is established.

Attention is directed to this illustrative graph in which isothermic lines are displayed as generally elliptical patterns on a partial cross-sectional view of a bearing similar to that shown in FIG. 1. Of importance is the relationship of the temperature measured at or estimated for the various locations within the laminate 12 of the bearing 10 as it bears to the general structure and geometry of the bearing. Notice specifically that zones of increasing temperature are designated from 20 through 32. The location of maximum temperature rise due to hysteresis is thus within zone 20. The data was generated through the use of analytic tools, such as computer modeling and heat transfer analysis which are known in the art. It should be understood that the metallic inner and outer housing 8 and 9, respectively, act as heat sinks. At the interface of inner housing 8 and the laminate 12 is a first conductive boundary 34 over which heat from hysteresis flows. Similarly, a second conductive boundary 36 is disposed between the outer housing 9 and the laminate 12. In the generation of the data illustrated in FIG. 2, the bearing's inner housing 8 was made from a steel alloy, and the bearing's outer housing 9 was made from an aluminum material having a higher thermal coefficient than the steel inner housing. This difference in thermal coefficient accounts for the skewing or shifting of the location of maximum temperature rise from the geometric center of the laminate 12 towards the inner housing 8.

In a device such as the bearing 10 shown in the figures quite often one or both ends 38 and 40, the top and bottom, respectively as shown, of the laminate are exposed to the ambient air. Increased heat dissipation from these ends 38, 40 occurs from natural convection and is heightened by increased air velocity, adjacent thereto and in direct thermal communication therewith, such as would occur during flight of a helicopter in which such a bearing, for example, is used as a main rotor bearing. Thus a first convection boundary 42 is disposed at said top end 38 and a second convection boundary 44 is disposed at said bottom end 40 of the laminate 12. Dependent on the relative size of the exposed surface area of each of these ends 38, 40 the location of maximum temperature rise, zone 20, may be skewed or otherwise displaced towards one of the ends.

Parenthetically, as shown in the Figure, fluctuations within the generally smooth elliptical temperature patterns can be caused, for example, by the more efficient thermal conductivity of the non-extensible layers 16A–16G when said layers are composed of metal. If the effect of said fluctuations are of undesirable consequence of sufficient magnitude in a particular application, the invention can be practiced so as to lessen this effect on bearing operation by the appropriate apportioning of layers as taught herein.

The heat buildup attributable to hysteresis combined with the heat sinks at the boundaries 34, 36, 42, 44 when the bearing is used in low temperature operation creates a non-uniform temperature gradient throughout the laminate 12 which in turn renders specific ones of the resilient layers 14A–14H, or portions 50–56 of the resilient layers, stiffer to torsional deflection. This is due to the fact that stiffness of elastomer is dependent on temperature as well as other properties such as geometry. Unfortunately in many applications many of these other properties are fixed or dictated by other needs and, therefore, may not be available to serve as control variables to yield a specific stiffness and thereby overcome the undesirable effects of temperature.

In accordance with the invention a specific property of elastomer material is controlled or otherwise varied so as to obtain a more uniform stiffness throughout the laminate 12 and thereby offset the effects of this temperature gradient. This renders the bearing 10 more fit for low temperature use due to a more uniform strain distribution and lower torsional stiffness. The invention effectuates its purposes by controlling the damping coefficient of the elastomer within each layer 14A–14H.

Returning to FIG. 1 attention is directed to the laminate 12. In the practice of the present invention, data from empirical testing such as that displayed in FIG. 2 guides in the selection of elastomeric materials. With the geometry of the bearing 10, as shown in FIG. 1, the damping coefficient of the elastomer material in the resilient layers 14A–14H is specifically chosen so as to increase from portion 50 through portion 56. Thus material with the lower damping coefficient is disposed at or near the location of maximum temperature rise, zone 20 (FIG. 2), and succeedingly higher damping coefficients are associated with the location of succeedingly lower temperature zones 22 through 32, consecutively.

The varying of the damping coefficient in an elastomer, for example, of either natural or synthetic rubber is not beyond the skill of one trained in the art. The technique may, for example, involve an altering in amount or proportion of the carbon black loading or the oil content in the rubber compound, or modifying the cure system, or a combination thereof.

In the practice of the invention as thus described, at least one of the resilient layers 14A–14H is graduated into a multiplicity of portions 50–56 having a preselected size and comprised of a material characterized by a preselected damping coefficient whose selection in both instances depends on the relative location of the elastomer within the at least one of the layers. Preferably, the gradations are in discrete segmental portions 50–56 as depicted in the figure, though a continuum within the one of the layers 14A–14H of a multiplicity of damping coefficients is within the purview of the invention.

It can be seen that several of the resilient layers 14A through 14H are depicted in FIG. 1 as comprising a plurality of segments or portions 50–56. As shown the resilient layers nearest the housings 8 and 10, namely resilient layers 14A and 14H, are characterized by having a single damping coefficient throughout. The invention contemplates however the segmenting of any of the layers 14A–14H specifically including these layers 14A and 14H nearest the housings so as to achieve the desired stiffness within each portion of the layer. Thus the laminate 12 can be analytically divided into a matrix of locations with the elastomer within each location having an associated damping coefficient dependent upon that location's proximity to the boundaries 34, 36, 42, 44.

Though layers 14C and 14E are shown to each have five portions 50–56, it has been found that from a practical standpoint no more than three portions per resilient layer is preferred. To achieve a reduction in the number of portions needed, an averaging of the damping coefficients in adjacent portions, for example portion 50 and 52 of layer 14C, can yield an effective damping coefficient sufficiently close to the empirically calculated ideal. In a similar fashion a material having an average or composite damping coefficient can be utilized throughout any one of the layers 14A–14H in less critical applications of the invention.

In another embodiment of the invention, the damping coefficients is varied on an interlayer basis while maintained substantially uniform throughout each one of the layers 14A–14H. This eliminates the need to subdivide an elastomeric layer into portions and therefore simplifies manufacture. Though, of course, it may not yield as uniform a strain distribution, such a compromise measure may prove economical and perform satisfactorily for particular applications.

To summarize, the invention can be practiced by disposing resilient material of a higher damping coefficient in the resilient layers 14A and 14H adjacent or more proximate to the inner and outer housing 8 and 9 with resilient material of lower damping coefficient disposed towards the center of the laminate 12 and within the resilient layers. In less critical applications the layers 14B–14G are each of a single material with a uniform damping coefficient, and said layers concentrically disposed about the common center line 18 at successively closer radial distances have successively lower damping coefficients.

The invention may be practiced otherwise than as already described and illustrated. For example, any laminated device, such as a coupling may employ the laminate as taught herein. Further, the number of layers and portions thereof, may be varied to suit the particular application. Still other modifications and embodiments are within the spirit of the invention and are rendered obvious by this specification to persons skilled in the art.

What is claimed:

1. A device having an inner housing and an outer housing separated by and bonded to a laminate of alternating resilient and non-extensible layers characterized by the resilient layers adjacent to the housings being made of a material having a higher damping coefficient than the material in the resilient layers farther within the laminate and away from said housings.

2. The device of claim 1 wherein at least one of the resilient layers comprises a plurality of segments of elastomeric material, each of said segments having an associated damping coefficient preselected to improve the low temperature operating characteristics of the device.

3. The device of claim 1 wherein elastomeric materials of like damping coefficients within the laminate and between the housings are disposed in a generally elliptical pattern.

4. The device of claim 2 wherein the resilient material is a rubber, and said housings define the perimeter of the laminate at least on two sides, and wherein the rubber disposed nearer the perimeter of the laminate has an associated damping coefficient higher than that associated with the rubber within the laminate and away from said perimeter.

5. In a laminated bearing comprising a plurality of alternating and bonded together layers of elastomeric and substantially non-extensible material with the layers concentrically disposed about one another and a common axis so as to permit the bearing to support compressional loads applied generally normal to said layers and torsional loads applied about said axis, the improvement wherein at least one of said elastomeric layers comprises a first portion thereof having a first nominal damping coefficient and a second portion thereof having a second nominal damping coefficient, and a third portion thereof, disposed axially between said first and second portions and having a third nominal damping coefficient less than that of said first and second portions, said damping coefficients selected so as to improve the uniformity of the strain distribution across said laminate during low temperature operation of the bearing.

6. The bearing of claim 5 wherein the damping coefficient of each elastomeric layer or portion thereof is preselected so that the elastomeric layers share substantially equally the strain resulting from torsional displacements during low temperature operation.

7. The bearing of claim 5 wherein the layers are each frusto-conical.

8. The bearing of claim 5 wherein the bearing further includes an inner housing and an outer housing and wherein the laminate includes an inner elastomeric layer disposed adjacent and bonded to said inner housing and an outer elastomeric layer disposed adjacent and bonded to said outer housing, said inner and outer layers each having a nominal damping coefficient less than that of the elastomeric layers disposed in spaced concentric relation between them.

9. A device for accommodating compressive and torsional loading and torsional deflection under low temperature conditions, said device comprising a laminate of alternating and bonded layers of elastomer and metal, wherein each elastomeric layer has an associated average damping coefficient preselected so as to substantially equalize the stiffness of each of said elastomeric layers.

10. The device of claim 9 wherein at least one elastomeric layer includes a plurality of discrete portions each of a size and damping coefficient, preselected to substantially equalize the stiffness of said one layer during hysteresis heating of the laminate in low temperature operation of the device.

* * * * *